United States Patent
Rasor

(10) Patent No.: US 11,829,805 B2
(45) Date of Patent: Nov. 28, 2023

(54) SOFTWARE LOCK MANAGEMENT

(71) Applicant: International Business Machines Corporation, Armonk, NY (US)

(72) Inventor: Louis A. Rasor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 17/331,908

(22) Filed: May 27, 2021

(65) Prior Publication Data
US 2022/0382604 A1 Dec. 1, 2022

(51) Int. Cl.
G06F 9/46 (2006.01)
G06F 9/52 (2006.01)

(52) U.S. Cl.
CPC ...................... *G06F 9/52* (2013.01)

(58) Field of Classification Search
CPC ........................................................ G06F 9/52
See application file for complete search history.

(56) References Cited

U.S. PATENT DOCUMENTS

| | | | |
|---|---|---|---|
| 9,378,069 B2 | 6/2016 | Chiang |
| 9,766,810 B2 | 9/2017 | Baptist |
| 9,830,199 B2 | 11/2017 | McKenney |
| 10,740,028 B1 | 8/2020 | Ziya |

OTHER PUBLICATIONS

Anonymous, "Improving Distributed Read/Write Lock Throughput and Performance with Infiniband Tunnel Atomics Operations," IP.com, Disclosure No. IPCOM000262039D, Apr. 27, 2020, 3 pages. <https://ip.com/IPCOM/000262039>.
Anonymous, "Leveraging Correlations In Thread Interaction Behavior for Performance Optimization," IP.com, Disclosure No. IPCOM000213332D, Dec. 12, 2011, 3 pages. <https://ip.com/IPCOM/000213332>.
Keetha et al., "Distributed explode: A High-Performance Model Checking Engine to Scale Up State-Space Coverage," Columbia University Computer Science Technical Reports, CUCS-051-08, 2008, 6 pages.
Mell et al., "The NIST Definition of Cloud Computing," Recommendations of the National Institute of Standards and Technology, U.S. Department of Commerce, Special Publication 800-145, Sep. 2011, 7 pages.
Shang et al., "Dynamic Voltage Scaling with Links for Power Optimization of Interconnection Networks," The Ninth International Symposium on High-Performance Computer Architecture, Feb. 12-12, 2003, 12 pages.

*Primary Examiner* — Gregory A Kessler
(74) *Attorney, Agent, or Firm* — Scott S. Dobson

(57) ABSTRACT

A plurality of low-performance locks within a computing environment are monitored. It is identified that, during a time window, threads of one of the plurality of low-performance locks are in a lock queue for an average time that exceeds a time threshold. It is further identified that, during that same time window, the average queue depth of the one of the plurality of low-performance locks exceeds a depth threshold. The one of the plurality of low-performance locks is converted from a low-performance lock into a high-performance lock.

20 Claims, 5 Drawing Sheets

SOFTWARE LOCK MANAGEMENT

BACKGROUND

Modern computing systems usually include functionality that relates to balancing operating a substantial number of processing threads as quickly as possible against utilizing as few resources as possible. Often processing threads will build up at one or more sections of a computing process, such that the computing system will use a locking algorithm/synchronization mechanism to work through this backlog. For example, a single storage server may include thousands of locks to process such a backlog of threads. Examples of locks include spinlocks that use one variable for the lock (i.e., 4 bytes memory) for all threads and causes threads to wait in a loop (e.g., as they "spin") while waiting for execution, ticket locks that use also one variable (i.e., 4 bytes memory) and issue "tickets" to threads to control which threads are executed, and array-based queuing locks (ABQL, or "queue locks") in which each thread spins on unique memory locations (e.g., has a dedicated memory location).

SUMMARY

Aspects of the present disclosure relate to a method, system, and computer program product relating to modulating a type of lock used in a computing device to scale up or down based on usage. For example, the method includes monitoring a plurality of low-performance locks within a computing environment. The method also includes identifying that during a time window threads of one of the plurality of low-performance locks are in a lock queue for an average time that exceeds a time threshold. The method also includes identifying that during the time window the average queue depth of the one of the plurality of low-performance locks exceeds a depth threshold. The method also includes converting the one of the plurality of low-performance locks from a low-performance lock into a high-performance lock. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
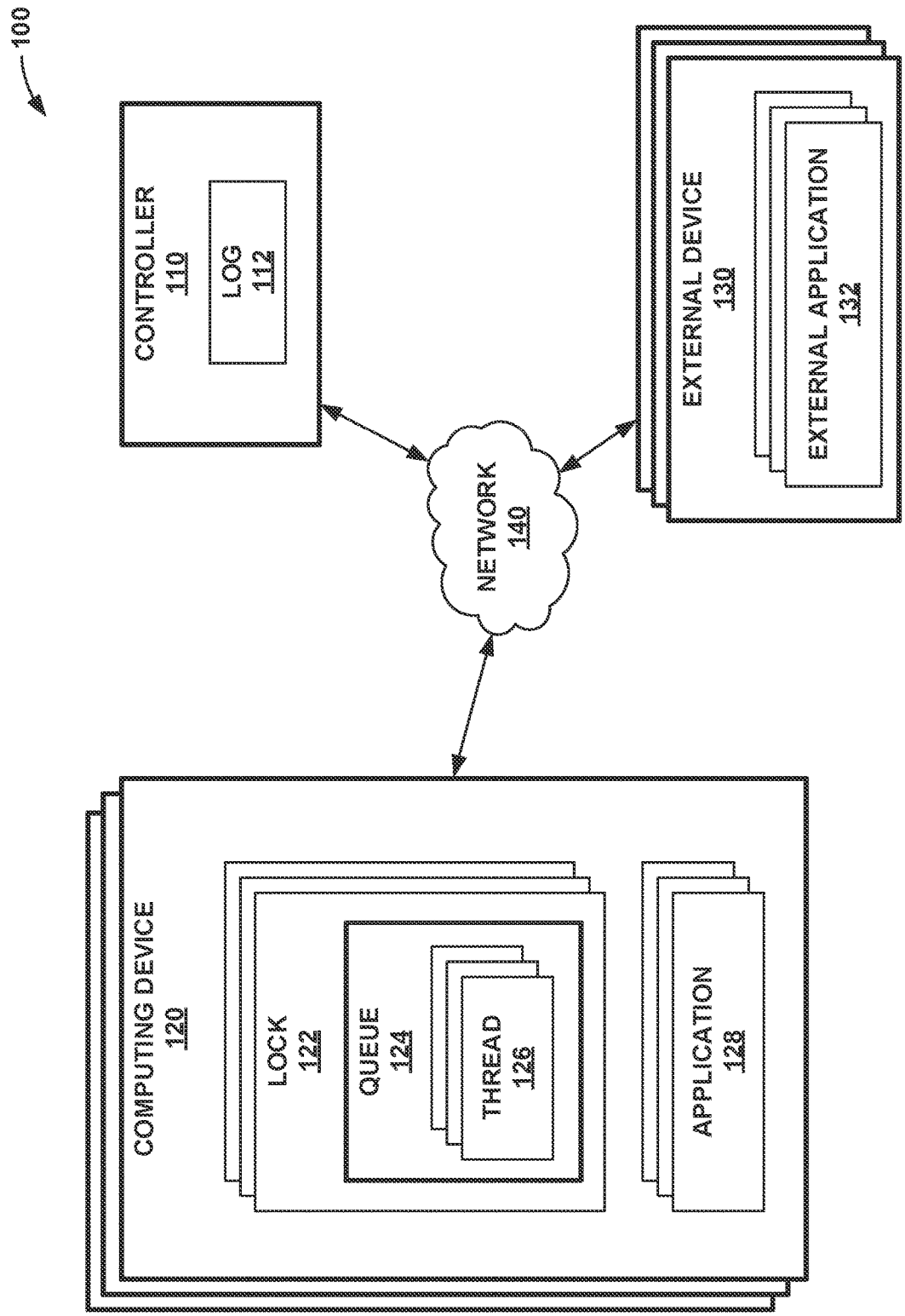
FIG. 1 depicts a conceptual diagram of an example system in which a controller may manage software locks for a computing device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing software locks for a computing device, while more particular aspects of the present disclosure relate to scaling a software lock up or down depending upon a volume of threads that the software lock is receiving over a period of time. While the present disclosure is not necessarily limited to such applications, various aspects of the disclosure may be appreciated through a discussion of various examples using this context.

In conventional computing systems, it is typical that processing threads may occasionally build up as a backlog at one or more locations. Engineers often try to balance what type of locks to use in different processes/locations to handle such backlogs when they occur. For example, locks may require more or less resources to operate (e.g., more or less memory and/or processing power allocated to the lock), and in return for this greater/lesser amount of resources may work through this backlog more or less efficiently. For example, a "low-performance" lock may include a lock that has a plurality of threads cycling or spinning at a shared memory location, which requires less memory (e.g., as the memory is shared between all threads) but also may increase network contention. Examples of low-performance locks may include spin locks or ticket locks, though any lock that is relatively less resource intensive but is also less efficient than a known and technically appropriate alternative may be understood to be a low-performance lock as used within this disclosure. For example, a low-performance lock may include any lock that results in numerous processors attempting to acquire a lock in response to a lock release.

Conversely, a "high-performance lock" may be more equitable in how it works through a backlog (e.g., such as by ensuring a first in, first out ("FIFO") ordering is used to select which threads are executed from a backlog). Additionally, or alternatively, a high-performance lock may be more scalable as a result of individual threads spinning on different memory locations, such that each given lock acquisition triggers only a single cache miss of one processor (e.g., such that the amount of invalidation is reduced). An example of a high-performance lock includes an array based queuing lock ("ABQL," referred to as a queue lock herein) that ensures that threads spin at unique memory locations such that only one processor will attempt to acquire the lock in response to a lock release though any lock that is relatively more resource intensive but is also more efficient than a known and technically appropriate alternative may be understood to be a high-performance lock as used within this disclosure. For example, a high-performance lock may include any lock that reliably results in a single processor attempting to acquire a lock in response to a lock release.

When setting up a conventional computing system, engineers often are tasked with manually deciding whether a given lock should be a high-performance or low-performance lock, as using all high-performance locks would require too much memory but using all low-performance locks would cause a performance of the conventional computing system to decrease. Therefore, often within conventional computing systems there is an initialization phase in which performance data is gathered while the conventional computing system is in use, such that engineers will analyze this performance data to attempt to determine how locks should be appropriately assigned now and in the future. This is a tedious and error-prone process, and it requires the performance data being indicative of all conditions that the conventional computing system will ever experience in order to be fully accurate, which is obviously unlikely. As a result, in production, many locks of conventional computing systems will either be suboptimally set up as a low-performance lock while still receiving high traffic and therein have a substantial amount of contention (e.g., such that this low-performance lock is a "hot lock"), or be suboptimally set up as a high-performance lock while receiving a low volume of threads (such that memory is wasted on this high-performance lock that does not need the perpetually assigned resource).

To attempt to fix this, certain conventional computing systems include an automatic conversion between a low-performance lock and a high-performance lock in response to determining that there are more (or less) than a threshold amount of processors (e.g., 16 processors) waiting in a queue for the lock. However, such a low-granularity approach has a tendency to convert a low-performance lock to a high-performance lock in response to a false positive determination of being over-utilized in response to a single non-indicative momentary spike. For example, if a queue of this lock had an average of 5 processors waiting in a queue for the lock for the last hour, and then momentarily surges up to 20 processors in one instant, the conventional computing system would automatically immediately convert the low-performance lock to a high-performance lock. However, if no threads are received for the next, e.g., two minutes, this would cause the high-performance lock to be effectively immediately converted back to a low-performance lock (such that the conversion to the high-performance lock was functionally unnecessary). Similarly, if a queue of this lock had an average of 20 processors within the queue for an hour and then suddenly has no processors for 30 milliseconds, then the conventional computing system may immediately cause the high-performance lock to convert to a low-performance lock. Put differently, while this automatic conversion between some low-performance locks and high-performance locks can help in a theoretical manner, in a real system that includes somewhat unpredictable and uneven streams of processing threads, such a conventional computing system may enter cycles in which it rapidly converts back and forth between a high-performance lock and a low-performance lock. Such "thrashing" between low and high-performance locks may cause performance issues, as each given conversion/reversion obviously requires some amount of computing resources.

Accordingly, aspects of this disclosure may solve or otherwise address these technical problems of conventional computing systems. For example, aspects of this disclosure are related to determining whether or not threads in a queue for a low-performance lock have been in this queue for both more than a threshold amount of time on average during a given time window, and also whether the "depth" of threads (e.g., the number of threads within the queue) is more than a threshold amount over that given time window, where a low-performance lock is converted into a high-performance lock in response to both thresholds being passed during that singular given time window. The high-performance lock may then be reverted back into the low-performance lock in response to detecting that a queue of the high-performance lock has less than a threshold number of threads over a threshold period of time (e.g., in response to seeing that the high-performance lock has zero threads in its queue at some point in time).

A computing device that includes a processing unit executing instructions stored on a memory may provide this functionality, this computing device referred to herein as a controller. The controller may be configured to identify and utilize different thresholds for different locks, such that these thresholds are set to avoid mode numbers for given locks (e.g., to avoid the controller thrashing back and forth between high and low-performance locks), are set lower for locks in more system-critical processes (e.g., so that locks for system-critical processes tend to be in the more efficient high-performance lock the majority of the time), and/or the like. By using such a granular approach that identifies and weighs both an average amount of time that threads spend within a queue and also weighs an average depth of threads within that queue, aspects of this disclosure may be configured to more accurately identify situations that warrant converting to a low-performance lock into a high-performance lock (and potentially reverting back afterwards), therein improving an efficiency and scalability of a computing system that utilize these aspects of this disclosure.

Further, though this disclosure is discussed as relating to a controller making a binary decision between a predetermined low-performance lock variety and a high-performance lock variety, in some situations a controller may modulate between three or more lock performances statuses (e.g., a low-performance lock, a mid-performance lock, and a high-performance lock). For example, a spin lock may require only causing all of the threads to spin on a single shared memory location without doing anything to individually track threads within a queue to (potentially) process threads in an inequitable manner such that it is categorized as the low-performance lock, whereas a ticket lock may have all threads spinning on a single shared memory location while tracking threads (e.g., to achieve a FIFO execution) using tickets to process threads in an equitable manner such that it is categorized as the mid-performance lock, and a queue lock has threads spinning on unique memory locations to process threads in an equitable and efficient manner, such that it is categorized as the high-performance lock. In this way, the controller may modulate between three (or more) gradations of locks that process threads with increasing equitability and efficiency in response to different amounts of depths of threads within queues and also different waiting times of threads within queues.

For example, FIG. 1 depicts environment 100 in which controller 110 manages a plurality of locks 122 on one or more computing devices 120. Controller 110 may include a computing device, such as computing system 200 of FIG. 2 that includes a processor communicatively coupled to a memory that includes instructions that, when executed by the processor, causes controller 110 to execute one or more operations described below. Computing devices 120 may also include a computing system similar to computing system 200 of FIG. 2, such as a storage server or the like. In some examples, controller 110 is separate from computing device 120 as depicted in FIG. 1, such that controller 110 manages locks 122 of a system that is physically external to itself. In other examples (not depicted), controller 110 may be integrated into the respective computing device 120 that includes locks 122 that controller 110 is managing.

Controller 110 may manage converting locks 122 from low performance to high performance (and reverting locks 122 back) based on data gathered from monitoring respective queues 124 of locks 122. Queue 124 may include all threads 126 that are waiting at the respective lock 122. Though queue 124 is depicted as being within lock 122 for purposes of illustration, one of ordinary skill in the art will understand queue 124 to relate to a set of threads 126 that are at any memory location (whether shared or unique) while waiting at lock 122. Threads 126 may be processing threads relating to a sequence of instructions generated by running software, such as one or more software applications 128 locally hosted on computing device 120 or external applications 132 hosted on one or more external devices 130 (which may also be similar to computing system 200 of FIG. 2).

Controller 110 may manage locks 122 over network 140. Network 140 may include one or more computer communication networks. An example network 140 can include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device (e.g., controller 110, computing device 120, external device 130) may receive messages and/or instructions from and/or through network 140 and forward the messages and/or instructions for storage or execution or the like to a respective memory or processor of the respective computing/processing device. Though network 140 is depicted as a single entity in FIG. 1 for purposes of illustration, in other examples network 140 may include a plurality of private and/or public networks over which controller 110 may manage locks 122 as described herein. For example, in some situations network 140 may include a cloud computing environment, in which controller 110 manages locks 122 of a network of computing devices 120 in response to threads 126 executed by the network of computing devices 120 falling above and/or below various thresholds at various locks 122.

Controller 110 monitors locks 122 within all computing devices 120. For example, controller 110 may track and evaluate how many threads 126 are within each queue 124 for each lock 122, and may further track and evaluate how long these threads 126 are within each queue 124 on average. Controller 110 may track and evaluate queues 124 of locks 122 across a time window. In some examples, controller 110 tracks and evaluates queues 124 over static time windows (e.g., over twenty millisecond intervals as measured relative to a central clock). In other examples, controller 110 may track and evaluate queues 124 over rolling time windows (e.g., such that the evaluation is always over the preceding twenty milliseconds), such that a given thread 126 received in queue 124 may be calculated across a number of consecutive rolling time windows.

In certain examples, controller 110 evaluates all locks 122 of environment using a time window of a uniform length (e.g., where each of locks 122 is tracked over time windows of a uniform duration of twenty milliseconds). In other examples, controller 110 evaluates locks 122 using different time windows depending upon different characteristics of the respective locks 122. For example, a first lock 122 that receives threads 126 that tend to increase or decrease in a linear fashion may have a relatively shorter time window being as there is less concern about a noisy spike impacting the validity of the data. Conversely, a second lock 122 that tends to receive threads 126 with unpredictable momentary spikes may have a relatively longer time window to avoid thrashing.

To go through a specific example, controller 110 may identify that during a first time window threads 126 within queue 124 of a low-performance lock 122 are in queue 124 for an average amount of time of twelve milliseconds while there are an average of eleven threads 126 within queue 124. Controller 110 may check a policy for this individual lock 122 to determine whether these average values are above or below the thresholds defined by this policy. For example, controller 110 may identify that a threshold amount of time for this lock 122 is ten milliseconds, while a threshold average depth of threads 126 is ten threads, such that lock 122 has currently passed both thresholds. In response to this determination, controller 110 may convert this respective lock 122 from low performance into high performance (e.g., converting this lock 122 from a spin lock or a ticket lock to a queue lock).

Once controller 110 determines to convert a respective lock 122, controller 110 causes threads 126 that are currently in queue 124 to engage with a low-performance variety of this lock 122 before any new threads 126 that are received are caused to engage a subsequent high-performance variety of this lock 122. For example, if there are fifteen threads 126 in queue 124 at a first point in time at which controller 110 determines to convert lock 122 from low performance to high performance, then controller 110 causes each of (these fifteen) threads 126 to spin within the initial version of queue 124 and eventually utilize the low-performance variety of lock 122. Beyond this, controller 110 causes any threads 126 that were received after this first point in time to be placed in a different version of queue 124 to engage a high-performance variety of lock 122, such that these threads 126 received after the first point in time utilize the high-performance variety of lock 122 only when the fifteen current threads 126 are all processed by the previous low-performance variety of lock 122.

In some examples, controller 110 continues monitoring lock 122 upon converting lock 122 to a high-performance variety. For example, controller 110 may continue monitoring converted locks 122 to determine whether to revert locks 122 from their high-performance variety back into their previous low-performance variety. Specifically, controller 110 may track and analyze a depth of queues 124 of high-performance locks 122 over a time window and revert these locks 122 to low-performance varieties when the depth of queue 124 falls below a threshold. This time window may be the same or different as the time window for which controller 110 tracked a low-performance variety of this respective lock 122. Similarly, the threshold depth that needs to be met for controller 110 to revert the respective lock 122 from its high-performance variety to a low-performance variety may be the same or different from the threshold depth that controller 110 used to convert this lock 122 from its low-performance variety to a high-performance variety. Though the word reverting is used herein to describe the process of going from a high-performance variety to a low-performance variety for the sake of clarity (e.g., to differentiate from the process of going from low-to-high performance), in some examples controller 110 changes one or more locks 122 that have always been of the high-performance variety into a low-performance variety (e.g., from queue lock to spin lock or ticket lock), such that it is not a true "reversion" to a previous state.

Controller 110 may maintain log 112 that reflects conversions and reversions of locks 122. Controller 110 may be configured to update log 112 every time that controller 110 converts any lock 122 from a low-performance variety to a high-performance variety, or reverts from a high-performance variety to a low-performance variety. Controller 110 and/or an authorized user may analyze log 112 to determine whether policies that control thresholds for each lock 122 are properly set. For example, controller 110 may analyze log 112 on a set schedule (e.g., once every 12 hours) to see if a policy has caused one identified lock 122 to convert and revert back and forth between a low-performance variety and a high-performance variety more than some threshold amount (e.g., more than fifty times per hour on average over the preceding 12 hours). If controller 110 (or an authorized user that has access to log 112) determines that this is the case, controller 110 (and/or the authorized user) may change thresholds for that lock 122 accordingly (e.g., such that relatively more extreme values are set that require less likely values to be hit to module between a low and high-performance variety).

Figure 2:
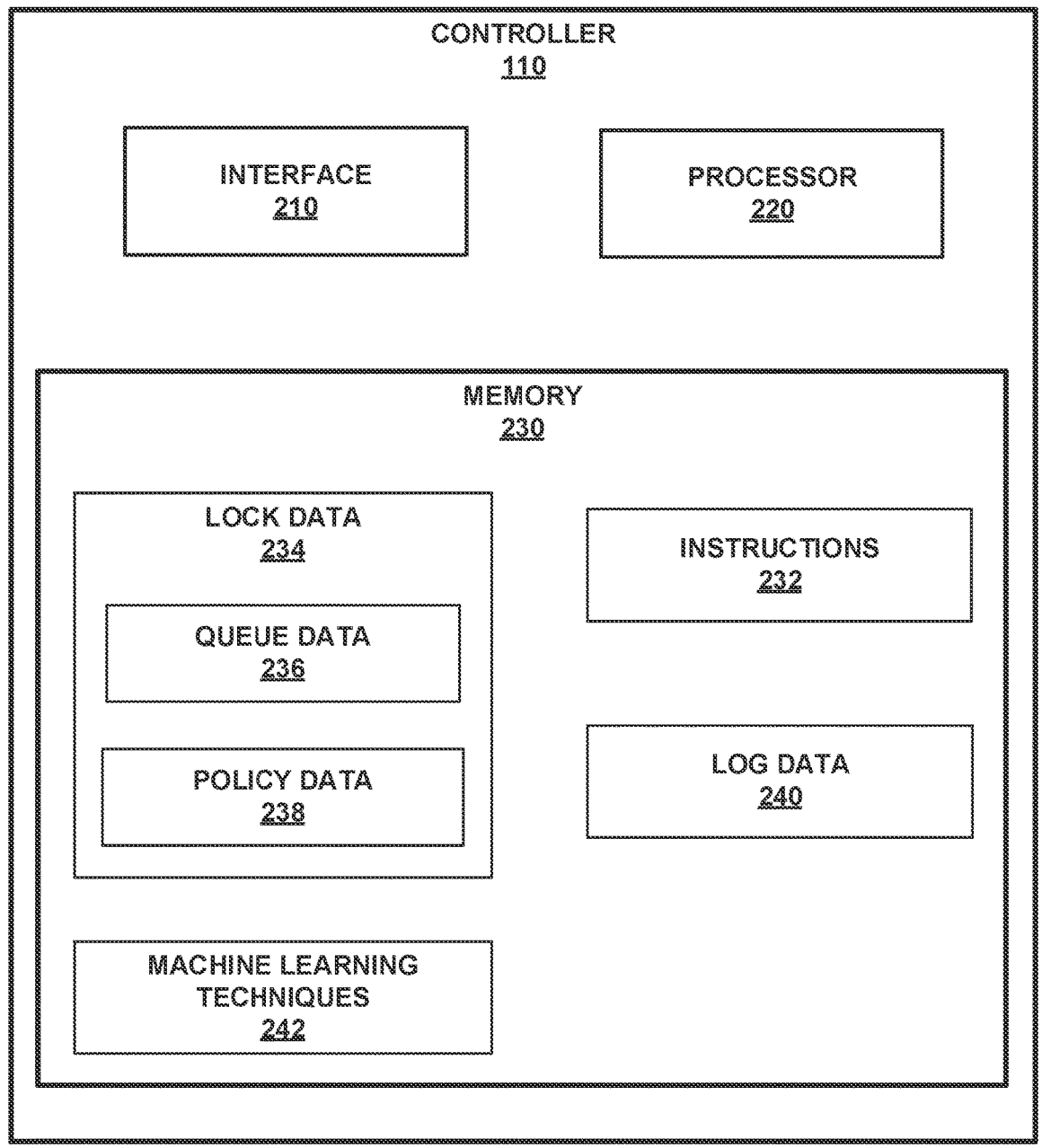
FIG. 2 depicts a conceptual box diagram of example components of the controller of FIG. 1.

As described above, controller 110 may be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with computing devices 120, external devices 130, or the like. Interface 210 may include one or more network interface cards, such as Ethernet cards and/or any other types of interface devices that can send and receive information. Various numbers of interfaces may be used to perform the described functions according to particular needs.

As discussed herein, controller 110 may be configured to manage converting and reverting locks 122 between a low and high-performance variety. Controller 110 may utilize processor 220 to thusly manage locks 122. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage locks 122 accordingly.

Processor 220 may manage a status of locks 122 according to monitored factors according to instructions 232 stored on memory 230 of controller 110. Memory 230 may include a computer-readable storage medium or computer-readable storage device. In some examples, memory 230 includes one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like.

In addition to instructions 232, in some examples gathered or predetermined data or techniques or the like as used by processor 220 to manage locks 122 as described herein is stored within memory 230. For example, memory may also include log data 240, which may include the record of all conversions and reversions between a low-performance variety and a high-performance variety (and dates and times thereof) for each lock 122 monitored and managed by controller 110 (e.g., such that log data 240 is stored in a format that uniquely identifies each lock 122 so that a history of each lock 122 may be collected and analyzed via log 240). Memory 230 may also include information described above that is gathered and/or utilized by controller 110 in monitoring locks 122, such as lock data 234 and queue data 236.

Queue data 236 may include numbers of threads 126 within queue 124 and/or a time duration over which these threads 126 were within queue 124. Lock data 234 may also include policy data 238, which can include the thresholds that it takes to convert each respective lock 122 from a low-performance variety to a high-performance variety, and subsequently revert locks 122 from this high-performance variety to a low-performance variety. As discussed herein, each lock 122 may have unique policies as held within policy data 238, where these policies may have different thresholds (e.g., different average depths, different average wait times, and/or different time periods) for converting and reverting locks between a low-performance variety and a high-performance variety as discussed herein.

Memory 230 may further include machine learning techniques 242 that controller 110 may use to improve a process of managing locks 122 as discussed herein over time. Machine learning techniques 242 can comprise algorithms or models that are generated by performing supervised, unsupervised, or semi-supervised training on a dataset, and subsequently applying the generated algorithm or model manage locks 122. For example, using machine learning techniques 242, controller 110 may determine that certain thresholds for certain types of locks 122 that are used within certain processes may cause more thrashing, or more wasted resources, or more inefficiency, and may therefore modulate these thresholds for some or all locks 122 accordingly. Controller 110 may reinforce rules over time based on whether a performance and stability of computing devices 120 improves over time. For example, controller 110 may track whether or not any whether or not any locks 122 have been converted and reverted more than a threshold amount of times within a certain time window, and change various thresholds within threshold data 240 accordingly.

Machine learning techniques 242 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 242 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
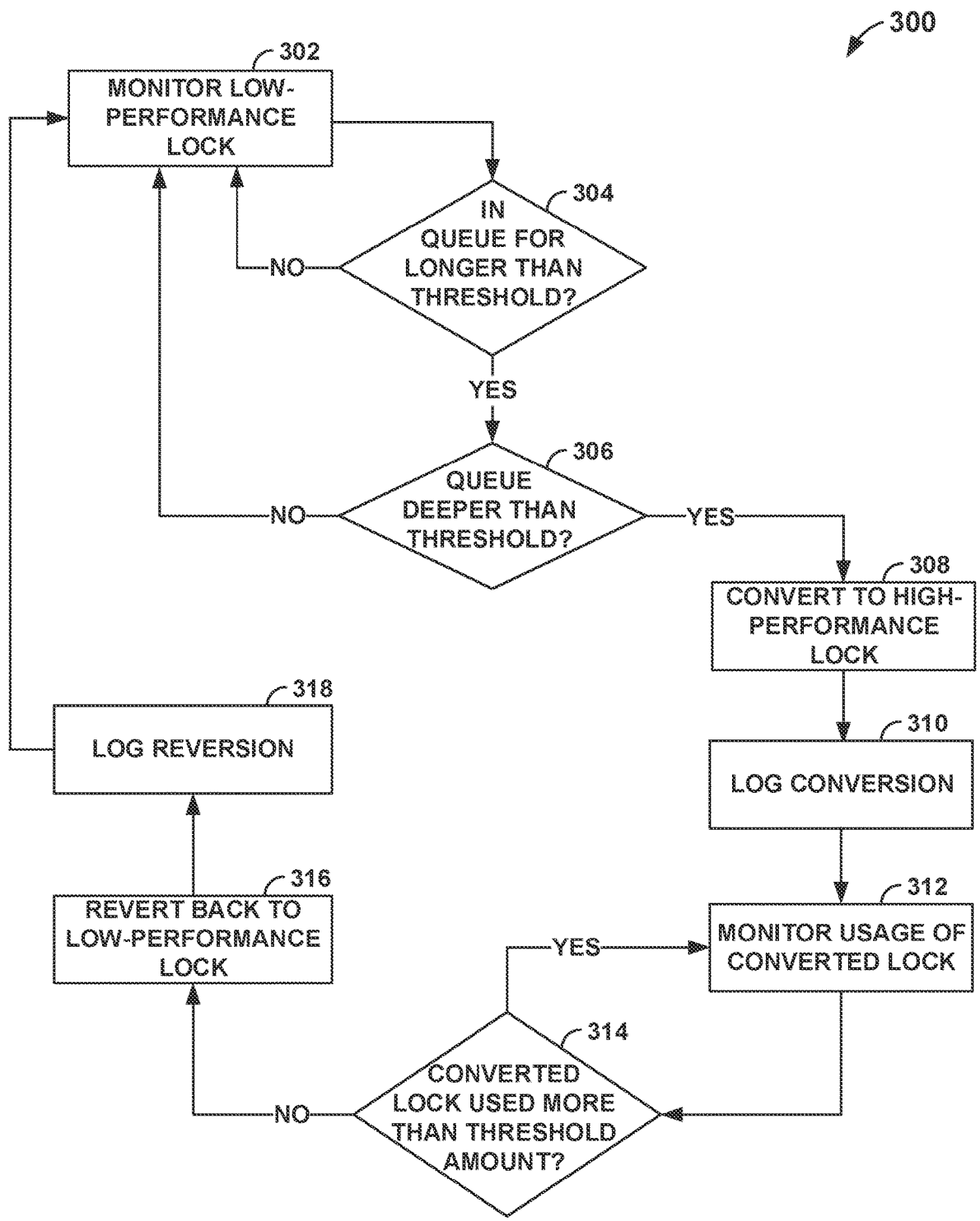
FIG. 3 depicts an example flowchart by which the controller of FIG. 1 may manage software locks for a computing device.

Using these components, controller 110 may manage locks 122 between low and high performance as discussed herein. In some examples, controller 110 manages locks 122 according to flowchart 300 depicted in FIG. 3. Flowchart 300 of FIG. 3 is discussed with relation to FIG. 1 for purposes of illustration, though it is to be understood that other systems and message may be used to execute flowchart 300 of FIG. 3 in other examples. Further, in some examples controller 110 executes a different method than flowchart 300 of FIG. 3, or controller 110 executes a similar method with more or less steps in a different order, or the like.

Flowchart 300 starts with controller 110 monitoring low-performance lock 122 (302). For example, controller 110 monitors queue 124 for each lock 122. Controller 110 specifically checks to see if threads 126 have been in queue 124 for longer than an average amount of time over a time window (304). Controller 110 may calculate an average amount of time that threads 126 have been in queue 124 over a rolling time window. In some examples, there is a threshold amount of time that is unique to the respective lock 122, and/or a rolling time window duration that is unique to respective lock 122. For example, controller 110 may identify that a rolling window for lock 122 is to be ten milliseconds, and that a threshold average time of threads 126 is eight milliseconds. Accordingly, if controller 110 determines that over a given rolling window of ten milliseconds that an average time of threads 126 in queue 124 is seven milliseconds, controller 110 determines that threads 126 have not been in queue 124 for longer than the threshold ("NO" branch from 304), and continue monitoring lock 122.

Conversely, if controller 110 determines in a subsequent rolling window of ten milliseconds that an average time of threads 126 in queue 124 is nine milliseconds, then controller 110 determines that threads 126 have been in queue 124 for longer than the threshold ("YES" branch from 304). In response to this, controller 110 determines whether or not an average depth of queue 124 is deeper than a threshold (306). Controller 110 may analyze this depth over the same rolling time window in which an average time of threads 126 in queue 124 was greater than the threshold. If controller 110 determines that a threshold is twenty threads 126, where the average depth of threads 126 within queue 124 during the rolling time window was only fifteen threads 126 ("NO" branch from 306), controller 110 may determine that the depth within queue 124 for lock 122 was below the threshold depth such that controller 110 may continue monitoring lock 122 (302).

Controller 110 eventually determines that over a time window that an average wait time of threads 126 within queue 124 exceeded a wait time threshold for lock 122 ("YES" branch from 304), while also determining that over that same time window that an average depth of threads 126 within queue 124 exceeded a depth threshold for lock 122 ("YES" branch from 306"). In response to these determinations, controller 110 converts lock 122 into a high-performance variety of a software lock 122 (308). For example, controller 110 may convert a spin or ticket lock into a queue lock. Once converted, controller 110 logs this conversion into log 112 (310). Controller 110 may record what lock 122 was converted into, and on what day and time this conversion took place.

Once converted, controller 110 monitors a usage of this high-performance lock 122 (312). In some examples, for locks 122 that were initialized as high performance, flowchart 300 functionally begin for a respective lock 122 with monitoring usage of this high-performance lock 122 (312). Controller 110 analyzes whether or not this high-performance lock 122 is used more than a threshold amount (314). A threshold amount may include a minimum depth within queue 124 over a period of time. In some examples, a threshold amount is zero within a time window (e.g., once within 100 milliseconds), such that controller 110 only determines that this high-performance lock 122 has less than the threshold amount if there are zero threads 126 in queue 124 over this time period. If controller 110 detects that this high-performance lock 122 is being used more than this threshold amount ("YES" branch from 314), controller 110 continues monitoring this high-performance lock 122 (312).

Conversely, if controller 110 determines that high-performance lock 122 is being used less than the threshold amount ("NO" branch from 314), controller 110 reverts this lock 112 back to low performance (316). Once reverted back into low-performance lock 122, controller 110 logs this reversion into log 112 (318). Controller 110 may log this reversion with a date and time, as well as a unique identifier of the respected reverted lock 122. Upon logging this reversion, controller 110 continues monitoring this low-performance lock 122 (302) to reset flowchart 300.

Figure 4:
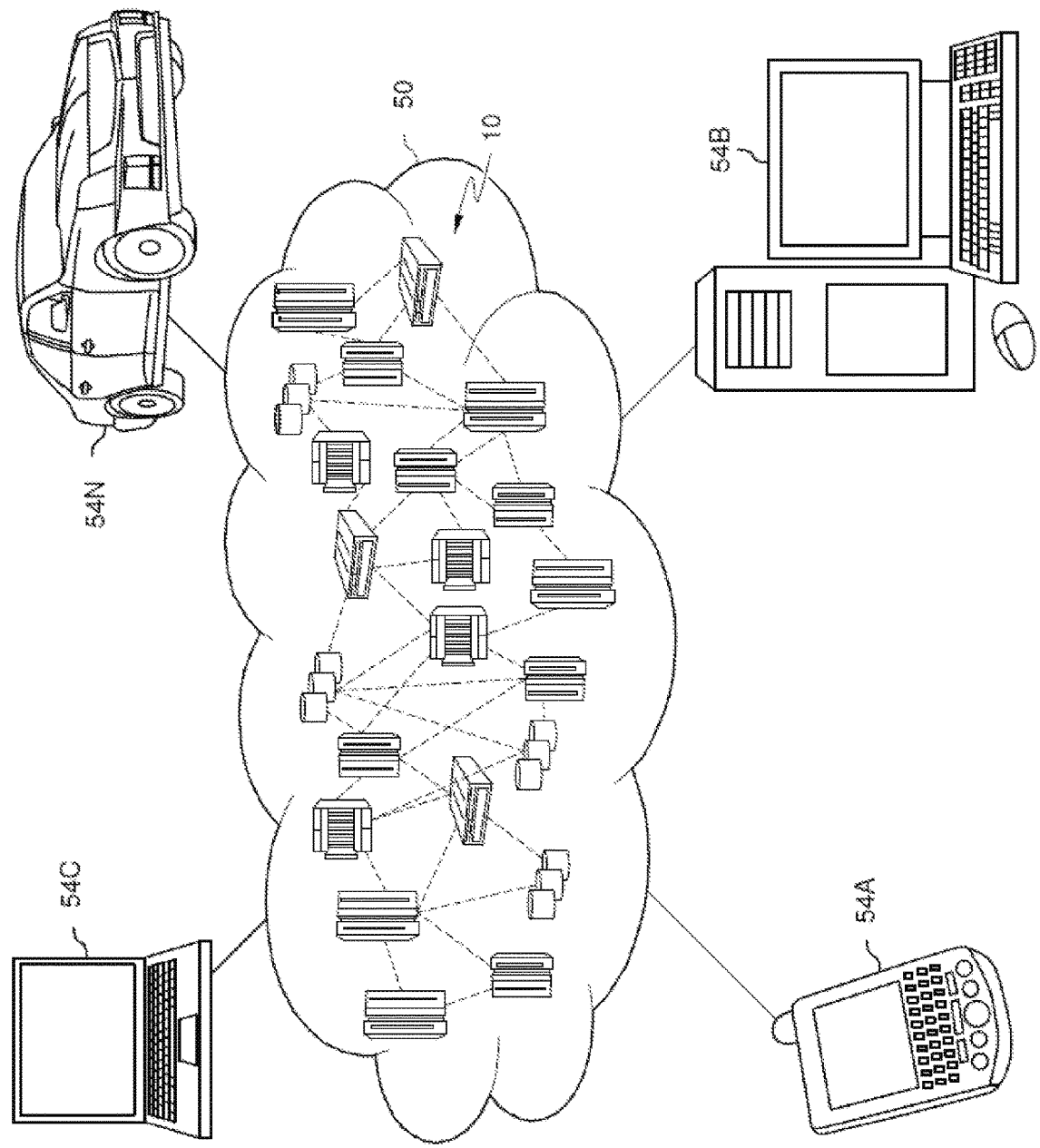
FIG. 4 depicts a cloud computing environment, in accordance with some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
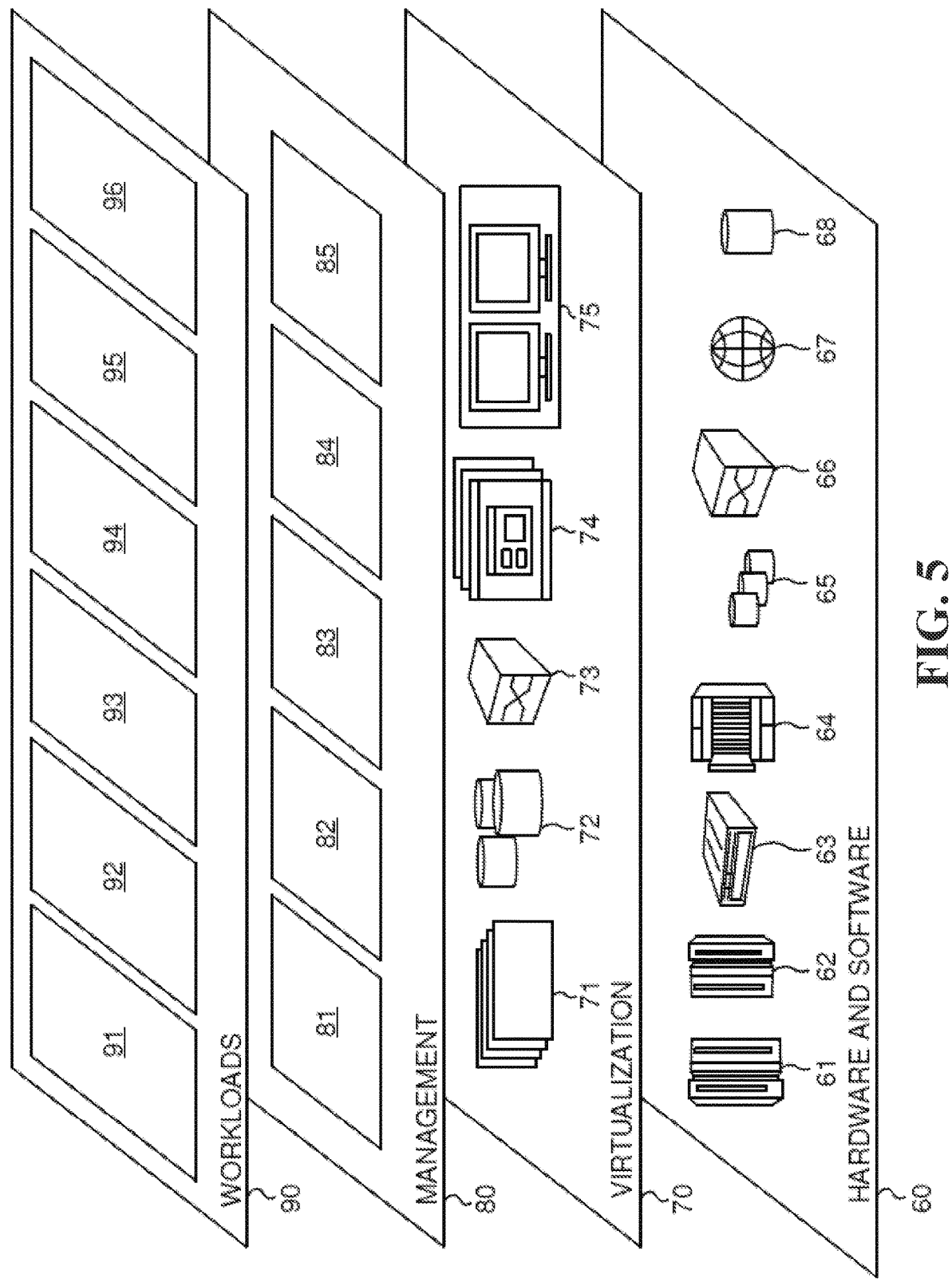
FIG. 5 depicts abstraction model layers, in accordance with some embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software lock management 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    monitoring a plurality of locks within a computing environment;
    identifying that during a time window threads of one of the plurality of locks are in a lock queue for an average time that exceeds a time threshold;
    identifying that during the time window the average queue depth of the one of the plurality of locks exceeds a depth threshold; and
    converting the one of the plurality of locks from a low-performance lock into a high-performance lock, wherein the high-performance lock is more resource-intensive than the low-performance lock.

2. The computer-implemented method of claim 1, further comprising reverting the high-performance lock back into the low-performance lock.

3. The computer-implemented method of claim 2, further comprising:
    updating a log in response to converting the one of the plurality of locks into the high-performance lock to reflect this conversion; and
    updating the log in response to converting the one of the plurality of locks back into the low-performance lock to reflect this reversion.

4. The computer-implemented method of claim 2, wherein the reverting the one of plurality of locks from the high-performance lock back into the low-performance lock is in response to detecting that a queue of the high-performance lock has less than a threshold number of threads over a threshold period of time.

5. The computer-implemented method of claim 1, wherein the converting the one of the plurality of locks from the low-performance lock into the high-performance lock occurs at a first point in time, further comprising:
    processing threads that are in the lock queue for the one of the plurality of locks as of the first point in time via the low-performance lock; and
    processing threads that are received in the lock queue after the first point in time via the high-performance lock.

6. The computer-implemented method of claim 1, wherein each of the plurality of locks has a policy that defines the time threshold and the depth threshold for that respective lock of the plurality of locks.

7. The computer-implemented method of claim 1, wherein the plurality of locks includes spin locks and ticket locks.

8. The computer-implemented method of claim 7, wherein the high-performance lock is a queue lock.

9. The computer-implemented method of claim 1, wherein the time window is a rolling time window.

10. A system comprising:
    a processor; and
    a memory in communication with the processor, the memory containing instructions that, when executed by the processor, cause the processor to:
        monitor a plurality of locks within a computing environment;
        identify that during a time window threads of one of the plurality of locks are in a lock queue for an average time that exceeds a time threshold;
        identify that during the time window the average queue depth of the one of the plurality of locks exceeds a depth threshold; and
        convert the one of the plurality of locks from a low-performance lock into a high-performance lock, wherein the high-performance lock is more resource-intensive than the low-performance lock.

11. The system of claim 10, the memory containing additional instructions that, when executed by the processor, cause the processor to revert the high-performance lock back into the low-performance lock.

12. The system of claim 11, the memory containing additional instructions that, when executed by the processor, cause the processor to:
- update a log in response to converting the one of the plurality of locks into the high-performance lock to reflect this conversion; and
- update the log in response to converting the one of the plurality of locks back into the low-performance lock to reflect this reversion.

13. The system of claim 11, wherein the reverting the one of plurality of locks from the high-performance lock back into the low-performance lock is in response to detecting that a queue of the high-performance lock has less than a threshold number of threads over a threshold period of time.

14. The system of claim 10, wherein the converting the one of the plurality of locks from the low-performance lock into the high-performance lock occurs at a first point in time, the memory containing additional instructions that, when executed by the processor, cause the processor to:
- process threads that are in the lock queue for the one of the plurality of lock as of the first point in time via the low-performance lock; and
- process threads that are received in the lock queue after the first point in time via the high-performance lock.

15. The system of claim 10, wherein each of the plurality of locks has a policy that defines the time threshold and the depth threshold for that respective lock of the plurality of locks.

16. A computer program product, the computer program product comprising a computer-readable storage medium having program instructions embodied therewith, the program instructions executable by a computer to cause the computer to:
- monitor a plurality of locks within a computing environment;
- identify that during a time window threads of one of the plurality of locks are in a lock queue for an average time that exceeds a time threshold;
- identify that during the time window the average queue depth of the one of the plurality of locks exceeds a depth threshold; and
- convert the one of the plurality of locks from a low-performance lock into a high-performance lock.

17. The computer program product of claim 16, the computer-readable storage medium containing additional instructions that, when executed by the computer, cause the computer to revert the high-performance lock back into the low-performance lock.

18. The computer program product of claim 17, the computer-readable storage medium containing additional instructions that, when executed by the computer, cause the computer to:
- update a log in response to converting the one of the plurality of locks into the high-performance lock to reflect this conversion; and
- update the log in response to converting the one of the plurality of locks back into the low-performance lock to reflect this reversion.

19. The computer program product of claim 17, wherein the reverting the one of plurality of locks from the high-performance lock back into the low-performance lock is in response to detecting that a queue of the high-performance lock has less than a threshold number of threads over a threshold period of time.

20. The computer program product of claim 16, wherein the converting the one of the plurality of locks from the low-performance lock into the high-performance lock occurs at a first point in time, the computer-readable storage medium containing additional instructions that, when executed by the computer, cause the computer to:
- process threads that are in the lock queue for the one of the plurality of lock as of the first point in time via the low-performance lock; and
- process threads that are received in the lock queue after the first point in time via the high-performance lock.

\* \* \* \* \*